(12) United States Patent
Mizban et al.

(10) Patent No.: US 10,029,504 B2
(45) Date of Patent: Jul. 24, 2018

(54) SYSTEM AND METHOD OF ELECTRONICALLY PRESENTING DATA ITEMS ON A CARD

(71) Applicants: Zohreh Mizban, Mashhad (IR); Mostafa Yousefi, Mashhad (IR); Abazar Yousefi, Mashhad (IR)

(72) Inventors: Zohreh Mizban, Mashhad (IR); Mostafa Yousefi, Mashhad (IR); Abazar Yousefi, Mashhad (IR)

( * ) Notice: Subject to any disclaimer, the term of this patent is extended or adjusted under 35 U.S.C. 154(b) by 0 days.

(21) Appl. No.: 15/796,802

(22) Filed: Oct. 29, 2017

(65) Prior Publication Data

US 2018/0056700 A1    Mar. 1, 2018

Related U.S. Application Data

(60) Provisional application No. 62/441,392, filed on Jan. 1, 2017.

(51) Int. Cl.
| | |
|---|---|
| *H04B 1/38* | (2015.01) |
| *B42D 15/02* | (2006.01) |
| *H04B 1/40* | (2015.01) |
| *G06F 3/14* | (2006.01) |
| *G08B 6/00* | (2006.01) |
| *G09F 1/04* | (2006.01) |
| *G06F 3/16* | (2006.01) |
| *G06K 19/06* | (2006.01) |
| *G06F 21/60* | (2013.01) |

(52) U.S. Cl.
CPC ............. *B42D 15/022* (2013.01); *G06F 3/14* (2013.01); *G06F 3/16* (2013.01); *G08B 6/00* (2013.01); *G09F 1/04* (2013.01); *H04B 1/40* (2013.01); *G06F 21/602* (2013.01); *G06K 19/06037* (2013.01)

(58) Field of Classification Search
CPC .............................. B42D 15/022; H04B 1/40
USPC .................................... 455/73, 90.1
See application file for complete search history.

(56) References Cited

U.S. PATENT DOCUMENTS

| | | | | |
|---|---|---|---|---|
| 7,999,674 | B2* | 8/2011 | Kamen | A61M 5/14244 340/572.1 |
| 2012/0064828 | A1* | 3/2012 | Khan | H04L 63/0492 455/41.1 |
| 2014/0358689 | A1* | 12/2014 | Clegg | G06Q 30/0267 705/14.64 |

* cited by examiner

*Primary Examiner* — Ayodeji Ayotunde
(74) *Attorney, Agent, or Firm* — Barry Choobin; Patent 360

(57) ABSTRACT

A system and method for presenting data items on a card comprising a media device, a radio frequency transceiver, a memory unit and a processor. The media device is configured to render at least one type of media content items. The device is disposed on the card. The radio frequency transceiver receives a data item from at least one user terminal. The memory unit stores a set of program modules. The set of program modules comprises an input module, an output module, and an optimizer module. The input module, is configured to receive the data item from the radio frequency transceiver. The optimizer module is configured to convert the data item into a first media content item, the first media content item being in a format capable to be rendered by the media device. The output module renders the first media content item on the media device.

20 Claims, 7 Drawing Sheets

SYSTEM AND METHOD OF ELECTRONICALLY PRESENTING DATA ITEMS ON A CARD

TECHNICAL FIELD OF THE INVENTION

The invention disclosed herein generally relates to technical field of electronically presenting data items. More particularly, the invention relates to a system and method for electronically presenting media items on a card.

BACKGROUND

Recent years have witnessed massive strides in the field of communications technology. Human ingenuity has effectively resulted in invention of increasingly compact and powerful communication devices. In fact, sizes of communication devices have shrunken to minuscule levels. The communication devices have shrunken so much in size that the communication devices of today can be easily disposed on tiny surfaces.

The minuscular sizes of today's communication devices open door towards a world of immense potential. For example, the communication devices can be potentially used to improve security features in credit and debit cards, can be used to add decorative aspects in greeting cards, wallets, and also to enhance utility of shopping labels.

Moreover, the communication devices have the potential of being implemented on cards such as bank cards, greeting cards, card holders, and sim cards. However, present state of the art lacks products and systems which efficiently tap into the afore mentioned potential of minuscular communication devices.

Therefore, there is a need in the art for a system and method of electronically presenting data items on a card.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

In one embodiment of the present invention a system for presenting data items on a card comprises a media device, a processor, and a memory unit. The media device renders media content items. The media device is disposed on the card. The radio frequency transceiver receives a data item from at least one user terminal. The memory unit stores a set of program modules. The processor executes the set of program modules. The set of program modules comprises an input module, an optimizer module, and an output module. The input module, receives the data item from the radio frequency transceiver. The optimizer module converts the data item into a first media content item, the first media content item being in a format capable to be rendered by the media device. The output module renders the first media content item on the media device.

In one embodiment of the present invention, the media device is at least one of a Liquid Crystal Display screen, a Light Emitting Diode based display screen, an E-ink based display screen, an audio speaker, a haptic output device, a holographic projector, and a tablet computer. Further, the media content items are at least one of an image, a video, an audio, a text, and a holographic projection. Furthermore, the processor is at least one of a microprocessor, a video processor, an audio processor, a microcontroller, a graphic processing unit, a digital signal processor, and a computer processor. Moreover, the at least one user terminal is at least one of a smart phone, a tablet computer, a personal computer, a personal digital assistant and a laptop. Furthermore, the data item is at least one of a textual script, an audio recording, a voice recording, image, and a video.

Moreover, the radio frequency transceiver is at least one of a Global System for Mobile (GSM) module, a General Packet Radio Service (GPRS) module, a Long-Term Evolution (LTE) based transceiver, a Wireless Local Area Network (WLAN) based transceiver, and a Wi-Fi transceiver. Moreover, the card is at least one of a paper card, a plastic card, a vinyl card, and a silicon card. Furthermore, the card is at least one of a greeting card, a credit card, and a debit card. Further, the at least one user terminal comprises an input device, the input device being at least one of a microphone, a camera, and a keypad.

In one embodiment of the present invention, a method of presenting data items on a card comprises receiving, at a radio frequency transceiver, a data item from at least one user terminal. Further, the method comprises storing a set of program modules in a memory unit. Furthermore, the method comprises receiving, by a processor via an input module, the data item from the radio frequency transceiver. Furthermore, the method comprises converting, by the processor via an optimizer module, the data item into a first media content item, the first media content item being in a format capable to be rendered by the media device. Moreover, the method comprises rendering by the processor via an output module, the first media content item on the media device.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION OF THE INVENTION

Figure 1:
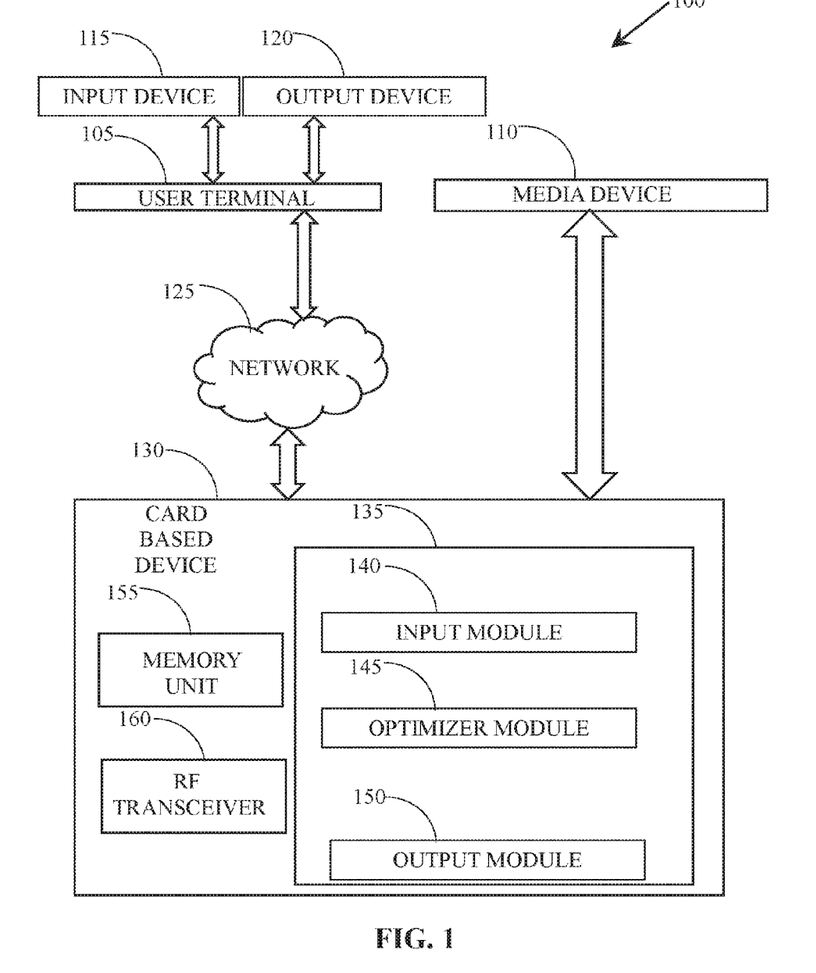
FIG. 1 exemplarily illustrates a block diagram of an environment implemented in accordance with various embodiments of the invention.

FIG. 1 exemplarily illustrates a block diagram of an environment 100 implemented in accordance with various embodiments of the invention. The environment 100 comprises a user terminal 105, a media device 110, a card based device 130, an input device 115 connected to the media device 110, and an output device 120 connected to the media device 110. The user terminal 105 is at least one of a smart phone, a tablet computer, a personal computer, a personal digital assistant and a laptop. The user terminal 105 is connected to the card based device 130 via a network 125. Examples of the network 125 include, but is not limited to local area network, Bluetooth network, WLAN network, and mobile networks. Further, the input device 115 connected to the user terminal 105, is at least one of a microphone, a camera, and a keypad. The output device 120 is at least one of a speaker, and a touchscreen.

In one embodiment of the present invention a system for presenting data items on a card is implemented in the environment 100. In one example, the system is implemented in the card based device 130. The card based device 130 is an electronic audio-visual information system of advertising used for all the bank cards, covers and bags of the bank cards, my cards, covers for SIM cards, official letters, invitation cards, advertising gifts and things alike. In one example, the card based device 130 is implemented as a printed circuit board (PCB). The card based device 130 comprises a processor 135, the radio frequency transceiver 160, and a memory unit 155. The processor 135 is at least one of a microprocessor, a video processor, an audio processor, a microcontroller, a graphic processing unit, a digital signal processor, and a computer processor. The media device 110 is capable of rendering at least one format of media content items. The format includes jpeg files, wmv files, png files, wma files, and txt files. The media device 110 is at least one of a Liquid Crystal Display screen, a Light Emitting Diode based display screen, an E-ink based display screen, an audio speaker, a haptic output device, a holographic projector, and a tablet computer. Further, the media content items are at least one of an image, a video, an audio, a text, and a holographic projection.

The media device 110 is disposed on the card. Moreover, the card is at least one of a paper card, a plastic card, a vinyl card, and a silicon card. Furthermore, the card is at least one of a greeting card, a credit card, and a debit card. The card based device 130 is also disposed on the card. The card based device 130 receives a data item from the user terminal 105 via the network 125 and the radio frequency transceiver 160. The data item is at least one of a textual script, an audio recording, a voice recording, image, and a video. The radio frequency transceiver 160 receives the data item from the user terminal 105. The radio frequency transceiver 160 is at least one of a Global System for Mobile (GSM) module, a General Packet Radio Service (GPRS) module, a Long-Term Evolution (LTE) based transceiver, a Wireless Local Area Network 125 (WLAN) based transceiver, and a Wi-Fi transceiver. The radio frequency transceiver 160 transmits the data item to the processor 135 and the memory unit 155.

The memory unit 155 stores a set of program modules. The processor 135 executes the set of program modules. The set of program modules comprises an input module 140, an optimizer module 145, and an output module 150. The input module 140, receives the data item from the radio frequency transceiver 160. The optimizer module 145 converts the data item into a first media content item, the first media content item being in a format capable to be rendered by the media device 110. The output module 150 renders the first media content item on the media device 110.

Figure 3:
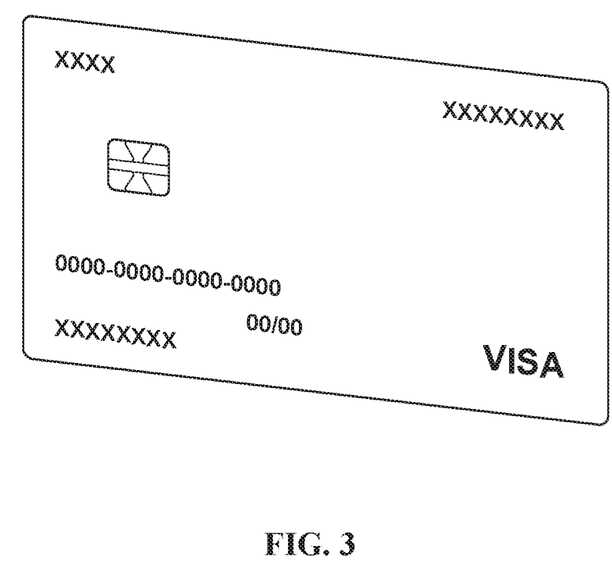
FIG. 3 exemplarily illustrates a first perspective view of an Automatic Teller Machine (ATM) card wherein the present invention is implemented.
Figure 4:
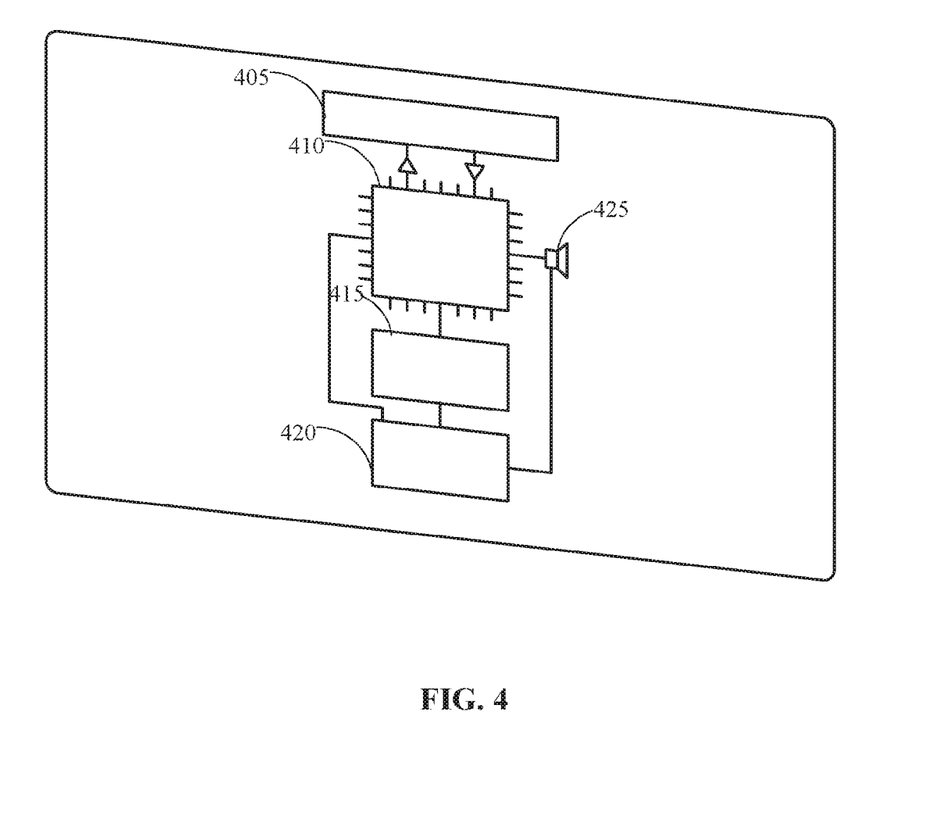
FIG. 4 exemplarily illustrates a second perspective view of the Automatic Teller Machine (ATM) card wherein the present invention is implemented.

In one example, the media device 110 is disposed on bank cards, and bank card covers. FIG. 3 exemplarily illustrates a first perspective view of an Automatic Teller Machine (ATM) card wherein the present invention is implemented. FIG. 4 exemplarily illustrates a second perspective view of the Automatic Teller Machine (ATM) card wherein the present invention is implemented. Banking operations and use of bank cards via ATMs and Point of Sale (POS) machines are performed several times a day. The media device 110 enables a user to receive complete information about user's bank account and operations done with the user's bank account. Even though paper receipts present information related to the users' bank account, the paper receipts have drawbacks such as short lifetime and a low security level. The media device 110 also enables the user to retrieve more information about the user's bank account. Further, the bank card comprises a micro-chassis to act as a play and pause button. In one example, the bank card also comprises a graphic LCD, a plurality of integrated circuits (IC) such as audio IC, Application specific IC, memory IC, power socket, speakers, batteries, stereo jacks, and Wifi Modules and Bluetooth modules. For example, referring to FIG. 4, the ATM card comprises a radio frequency transceiver 405, a processor 410, a memory device 415, a battery 420, and a speaker 425.

Referring FIG. 1 again, the bank card comprises the card based device 130. The processor 135 of the card based device 130 is at least one of a ARM™ IC and an ATMEGA™ IC. In one example, the card based device 130 receives data items from the user terminal 105. In one example, the user terminal 105 is a bank server. The data items comprises information regarding bank balances, transaction receipts, bank statements, advertisements, and news. The card based device 130 converts the data item into an audio file and a video file. The card based device 130 presents the video file in the graphic LCD and the audio files via the speakers. Further, the card based device 130 also implements a security code based encryption system for the data item. In another example, the card based device 130 comprises a Universal Serial Bus (USB) device port to enable the user to load video files, audio files, and text files into the card based device 130. In another example, the user is enabled to enter a textual script into the card based device 130 via a keypad. The card based device 130 converts the textual script into a voice recording of a computer voice. The card based device 130 stores the voice recording in the memory IC and plays the voice recording if the user presses the play button on the micro chassis. In another example, the card based device 130 enables the user to record own voice.

In another example, the media device 110 is disposed on official letters. The media device 110 enables a user to receive information in the official letter in an audio format. Further, the official letter comprises a micro-chassis to act as a play and pause button. In one example, the official letter also comprises a graphic LCD, a plurality of integrated circuits (IC) such as audio IC, Application specific IC, memory IC, power socket, speakers, batteries, stereo jacks, and Wifi Modules and Bluetooth modules. The official letter comprises the card based device 130. The processor 135 of the card based device 130 is at least one of a ARM™ IC and an ATMEGA™ IC. In one example, the card based device 130 receives a data item from the user terminal 105. The data item comprises information comprised in the official letter. The card based device 130 converts the data item into an audio file and a video file. The card based device 130 presents the video file in the graphic LCD and the audio files via the speakers. Further, the card based device 130 also implements a security code based encryption system for the data item. In another example, the card based device 130 comprises a Universal Serial Bus (USB) device port to enable the user to load video files, audio files, and text files into the card based device 130. In another example, the user is enabled to enter a textual script into the card based device 130 via a keypad. The card based device 130 converts the textual script into a voice recording of a computer voice. The card based device 130 stores the voice recording in the memory IC and plays the voice recording if the user presses the play button on the micro chassis. In another example, the card based device 130 enables the user to record own voice. The voice is recorded as at least one of an MP3 file, and WMA file.

In one example, the media device 110 and the card based device 130 are implemented in a doctor's prescription slip. The card based device 130 enables doctors to record prescriptions as voice recordings.

In another example, the media device 110 is disposed on one of a wallet and a card holder. When a user inserts a card into the wallet, the media device 110 announces card's name.

Figure 5:
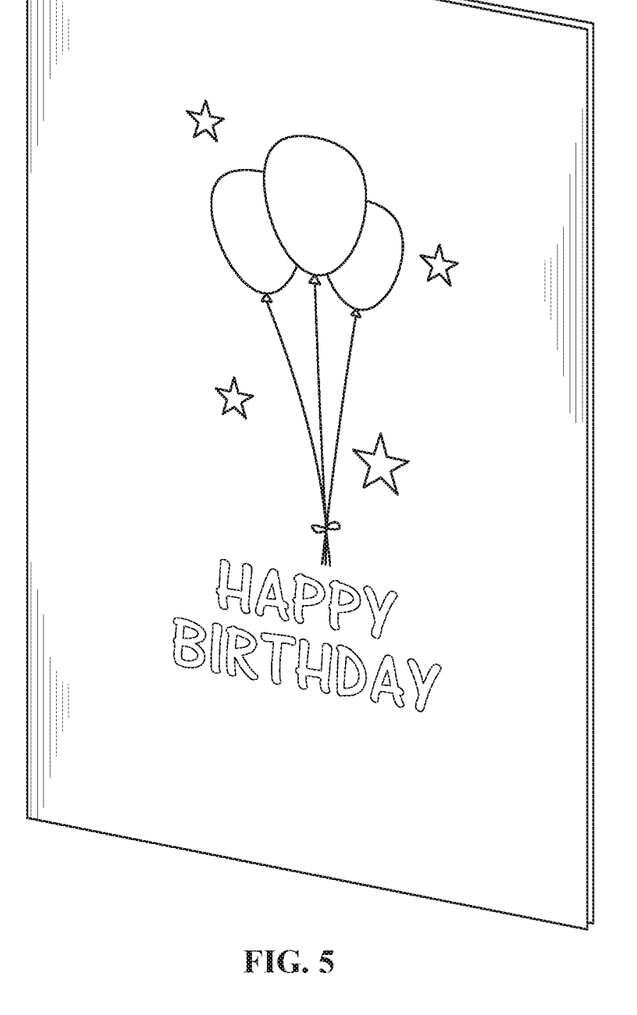
FIG. 5 exemplarily illustrates a perspective view of a closed greeting card wherein the present invention is implemented.
Figure 6:
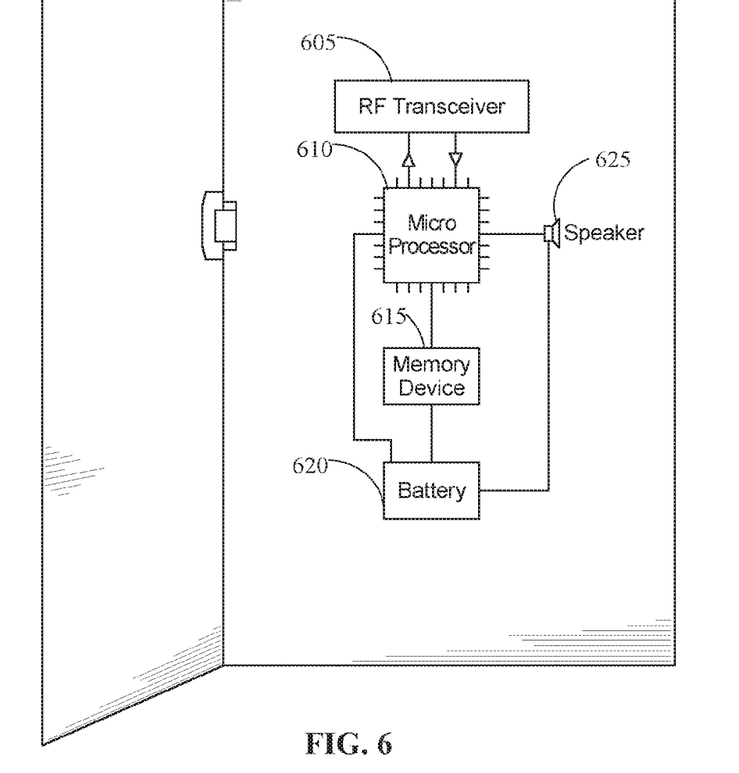
FIG. 6 exemplarily illustrates a perspective view of an open greeting card wherein the present invention is implemented.

In yet another example, the media device 110 is disposed on invitation cards. Examples of invitation cards include wedding invitation cards, anniversary invitation cards, and birthday party invitation cards. The media device 110 enables the user to implement a talking invitation card. FIG. 5 exemplarily illustrates a perspective view of a closed greeting card wherein the present invention is implemented. FIG. 6 exemplarily illustrates a perspective view of an open greeting card wherein the present invention is implemented. Referring to FIG. 6, the invitation card comprises, a radio frequency transceiver 605, a processor 610, a memory device 615, a battery 620, and a speaker 625.

Referring to FIG. 1 again, in yet another example, the media device 110 is implemented in a shopping label. The media device 110 presents advantages of products sold in a supermarket. As a result, the media device 110 results in implementation of smart shopping labels. In yet another example, the media device 110 is implemented in office letters, advertising packages, and gifts.

In yet another example, the media device 110 is implemented in a tourist brochure. The media device 110 presents information regarding a tourist spot in an audio-visual format. Furthermore, the media device 110 and the card based device 130 are implemented on security letters, business cards, flashcards, advertisement packaging, postcards, notebooks, gift cards, newspapers, magazines, books, food packages, and gift wrappings.

Figure 7:
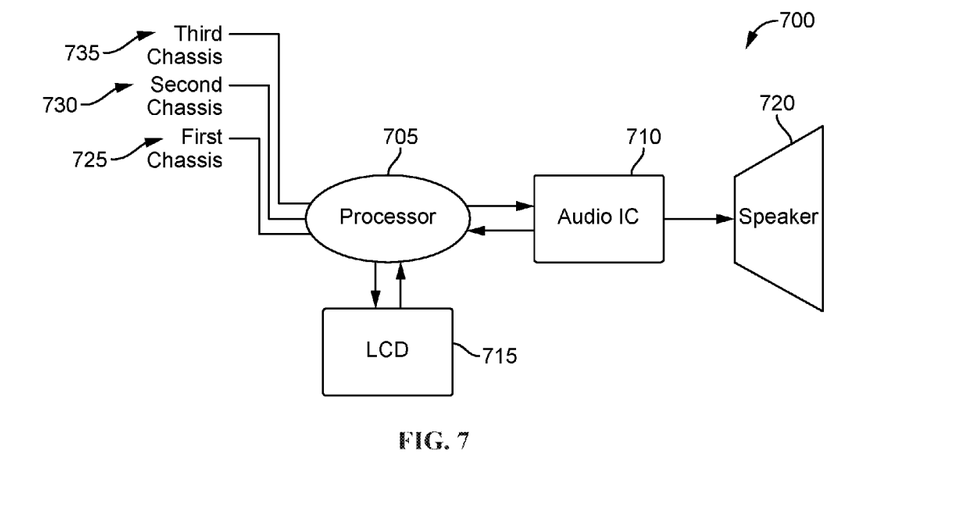
FIG. 7 exemplarily illustrates a block diagram model for presenting data items on the physical object based device in accordance with the present invention.

In an embodiment, the block diagram model 700 for presenting data items on the physical object based device is illustrated in FIG. 7. The device comprises a processor 705, an audio IC 710, a LCD 715, a speaker 720, chassis 725, 730, 735 and an audio IC 740. The audio IC 710 enables to record and play audios. Based on the requirement of the end user, the visual and audio components is installed optionally. In one example, the device is implemented in on a cover of banks cards, which enables to record and/or play both audio and visual files. The device is programmed and activated through chassis 725, 730, 735 or activated on removing the card from the cover through which the chassis 725, 730, 735 is activated.

In another example, the device is implemented in business cards, official letters and advertising catalogues, where the device is configured to allow recording of information only by the owner, prohibiting other third-party access to record.

In yet another example, the device is implemented on the tags of the product. The device is configured to display the QR code embedded with the information relating to the product.

In yet another example, the device is implemented in a physical object like a doll.

In yet another example, the device is implemented on the label of the products. The device is configured to present the voice of the manager or the owner of the brand offering a message on pressing the chassis. Also, the device is configured to embed QR code which let the customers to have information about the product or the company.

In yet another example, the device is implemented on the labels of the foodstuff packages which is configured to provide customers with the description of the nutritional values and the date of expiration of each product in an audio way. For an example, it could be communicated to the warehouse, so before finishing that product, it will announce the need for it.

In yet another example, the device is implemented on the gift cards where the device is configured to display the gifts available through customer could choose the gifts. Advantageously, this type of implementation also helps in branding the product or company.

Figure 2:
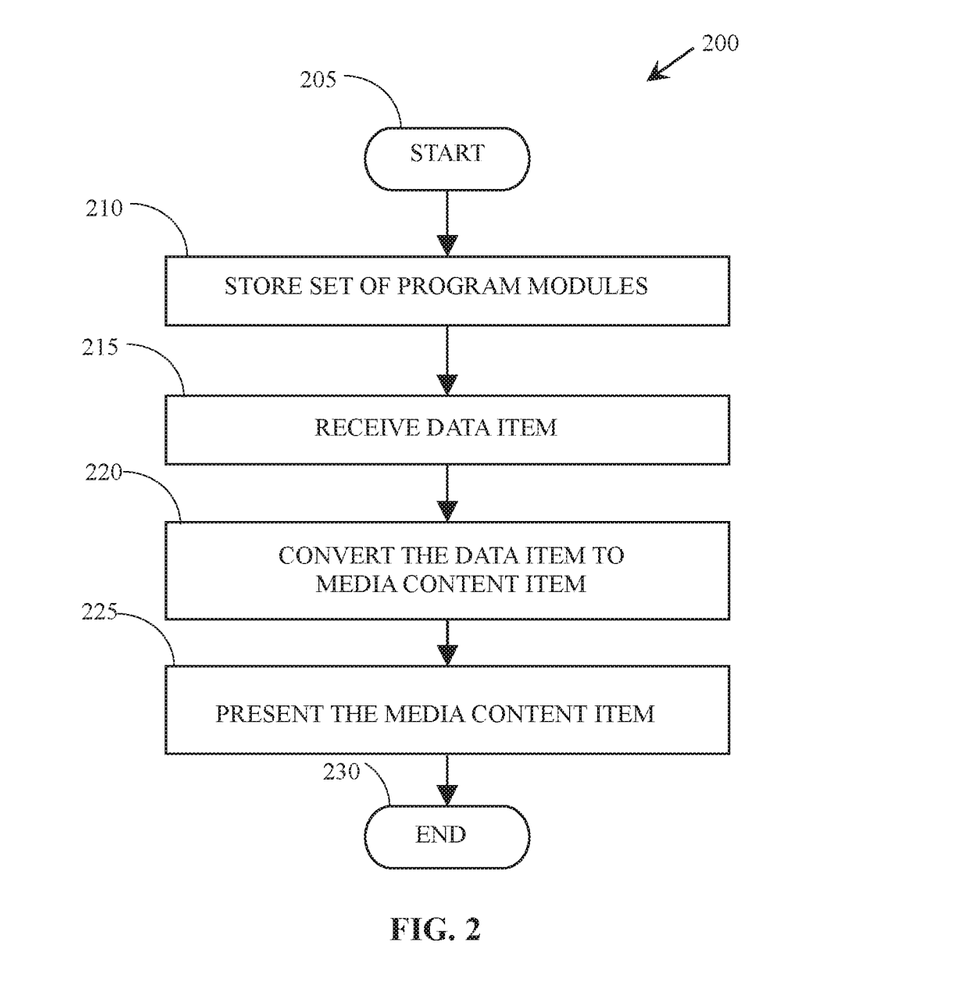
FIG. 2 exemplarily illustrates a flowchart of a method of electronically presenting data items on a card.

FIG. 2 exemplarily illustrates a flowchart of a method of electronically presenting data items on a card. The method 200 is implemented in an environment comprising a user terminal, a media device, a card based device, an input device connected to the media device, and an output device connected to the media device. The user terminal is at least one of a smart phone, a tablet computer, a personal computer, a personal digital assistant and a laptop. The user terminal is connected to the card based device via a network. Examples of the network include, but is not limited to local area network, Bluetooth network, WLAN network, and mobile networks.

Further, the input device connected to the user terminal, is at least one of a microphone, a camera, and a keypad. In one embodiment of the present invention a system for presenting data items on a card is implemented in the environment. The system comprises a media device, a processor, a radio frequency transceiver, and a memory unit. The processor is at least one of a microprocessor, a video processor, an audio processor, a microcontroller, a graphic processing unit, a digital signal processor, and a computer processor. The media device is capable of rendering at least one format of media content items. The card based device is disposed on the card. The card based device receives a data item from the user terminal via the network and the radio frequency transceiver. The radio frequency transceiver is at least one of a Global System for Mobile (GSM) module, a General Packet Radio Service (GPRS) module, a Long-Term Evolution (LTE) based transceiver, a Wireless Local Area Network (WLAN) based transceiver, and a Wi-Fi transceiver. The radio frequency transceiver transmits the data item to the processor and the memory unit. The method 200 commences at step 205.

At step 210, the memory unit stores a set of program modules. The processor executes the set of program modules. The set of program modules comprises an input module, an optimizer module, and an output module.

At step 215, the input module, receives the data item from the radio frequency transceiver. The data item is at least one of a textual script, an audio recording, a voice recording, image, and a video. The radio frequency transceiver receives the data item from the user terminal.

At step 220, the optimizer module converts the data item into a first media content item, the first media content item being in a format capable to be rendered by the media device. The format includes jpeg files, wmv files, png files, wma files, and txt files. The media device is at least one of a Liquid Crystal Display screen, a Light Emitting Diode based display screen, an E-ink based display screen, an audio speaker, a haptic output device, a holographic projector, and a tablet computer. Further, the media content items are at least one of an image, a video, an audio, a text, and a holographic projection.

At step 225, the output module renders the first media content item on the media device. The media device is disposed on the card. Moreover, the card is at least one of a paper card, a plastic card, a vinyl card, and a silicon card. Furthermore, the card is at least one of a greeting card, a credit card, and a debit card.

The method 200 ends at step 230.

Advantageously, the present invention converts written information into audio files. Further, the present invention is capable of playing text files on an unlimited loop. Furthermore, the present invention is capable of recording and playing long texts. The present invention is capable of being implemented in a plurality of different cards, such as advertisement and information packages, labels, letters, gifts, and different type of covers. The present invention records voice of a user directly, and is configured to convert written text into audio files as well. The present invention is capable of being used in security systems. The present invention is capable of being used for displaying advertisements.

The foregoing examples have been provided merely for the purpose of explanation and are in no way to be construed as limiting of the system and method for electronically presenting data items on the card, disclosed herein. While the system and method for electronically presenting data items on the card has been described with reference to various embodiments, it is understood that the words, which have been used herein, are words of description and illustration, rather than words of limitation. Further, although the system and method for electronically presenting data items on the card, has been described herein with reference to particular means, materials, and embodiments, the system and method for electronically presenting data items on the card is not intended to be limited to the particulars disclosed herein; rather, the system and method for electronically presenting data items on the card extends to all functionally equivalent structures, methods and uses, such as are within the scope of the appended claims. Those skilled in the art, having the benefit of the teachings of this specification, may effect numerous modifications thereto and changes may be made without departing from the scope and spirit of the system and method for electronically presenting data items on the card disclosed herein in their aspects.

What is claimed is:

1. A system for electronically presenting data items on a card, the system comprising:
    a media device capable of rendering media content items, wherein the media device is disposed on the card;
    a radio frequency transceiver configured to receive a data item from at least one user terminal;
    a memory unit to store a set of program modules;
    a processor to execute the set of program modules, wherein the set of program modules comprises:
        an input module, executed by the processor, configured to receive the data item from the radio frequency transceiver;
        an optimizer module, executed by the processor, configured to convert the data item into a first media content item, the first media content item being in a format capable to be rendered by the media device; and
        an output module, executed by the processor, configured to render the first media content item on the media device.

2. The system of claim 1, wherein the media device is at least one of a Liquid Crystal Display screen, a Light Emitting Diode based display screen, an E-ink based display screen, an audio speaker, a haptic output device, a holographic projector, and a tablet computer.

3. The system of claim 1, wherein the media content items are at least one of an image, a video, an audio, a text, and a holographic projection.

4. The system of claim 1, wherein the processor is at least one of a microprocessor, a video processor, an audio processor, a microcontroller, a graphic processing unit, a digital signal processor, and a computer processor.

5. The system of claim 1, wherein the at least one user terminal is at least one of a smart phone, a tablet computer, a personal computer, a personal digital assistant and a laptop.

6. The system of claim 1, wherein the data item is at least one of a textual script, an audio recording, a voice recording, image, and a video.

7. The system of claim 1, wherein the radio frequency transceiver is at least one of a Global System for Mobile (GSM) module, a General Packet Radio Service (GPRS) module, a Long-Term Evolution (LTE) based transceiver, a Wireless Local Area Network (WLAN) based transceiver, and a Wi-Fi transceiver.

8. The system of claim 1, wherein the card is at least one of a paper card, a plastic card, a vinyl card, and a silicon card.

9. The system of claim 1, wherein the card is at least one of a greeting card, a credit card, and a debit card.

10. The system of claim 1, wherein the at least one user terminal comprises an input device, the input device being at least one of a microphone, a camera, and a keypad.

11. A method of electronically presenting data items on a card, the method comprising:
    a receiving, at a radio frequency transceiver, a data item from at least one user terminal;
    storing a set of program modules in a memory unit;
    receiving, by a processor via an input module, the data item from the radio frequency transceiver;
    converting, by the processor via an optimizer module, the data item into a first media content item, the first media content item being in a format capable to be rendered by the media device; and
    rendering by the processor via an output module, the first media content item on the media device.

12. The method of claim 11, wherein the media device is at least one of a Liquid Crystal Display screen, a Light Emitting Diode based display screen, an E-ink based display screen, an audio speaker, a haptic output device, a holographic projector, and a tablet computer.

13. The method of claim 11, wherein the media content items are at least one of an image, a video, an audio, a text, and a holographic projection.

14. The method of claim 11, wherein the processor is at least one of a microprocessor, a video processor, an audio processor, a microcontroller, a graphic processing unit, a digital signal processor, and a computer processor.

15. The method of claim 11, wherein the at least one user terminal is at least one of a smart phone, a tablet computer, a personal computer, a personal digital assistant and a laptop.

16. The method of claim 11, wherein the data item is at least one of a textual script, an audio recording, a voice recording, image, and a video.

17. The method of claim 11, wherein the radio frequency transceiver is at least one of a Global System for Mobile (GSM) module, a General Packet Radio Service (GPRS) module, a Long-Term Evolution (LTE) based transceiver, a Wireless Local Area Network (WLAN) based transceiver, and a Wi-Fi transceiver.

18. The method of claim 11, wherein the card is at least one of a paper card, a plastic card, a vinyl card, and a silicon card.

19. The method of claim 11, wherein the card is at least one of a greeting card, a credit card, and a debit card.

20. The method of claim 11, wherein the at least one user terminal comprises an input device, the input device being at least one of a microphone, a camera, and a keypad.

\* \* \* \* \*